US010616368B2

(12) United States Patent
Sodaitis et al.

(10) Patent No.: US 10,616,368 B2
(45) Date of Patent: *Apr. 7, 2020

(54) ELECTRONIC INTERACTIVE BUSINESS CARD MOBILE SOFTWARE SYSTEM WITH CUSTOMER RELATIONSHIP MANAGEMENT DATABASE

(71) Applicant: Mobicard Inc., Las Vegas, NV (US)

(72) Inventors: Joshua Sodaitis, Cambridge, MA (US); Scott G. Milbury, Jr., Wakefield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,290

(22) Filed: Apr. 22, 2019

(65) Prior Publication Data

US 2019/0253516 A1    Aug. 15, 2019

Related U.S. Application Data

(63) Continuation-in-part of application No. 14/848,320, filed on Sep. 8, 2015, now Pat. No. 10,270,880.

(60) Provisional application No. 62/046,252, filed on Sep. 5, 2014.

(51) Int. Cl.
   *H04L 29/08* (2006.01)
   *G06F 16/955* (2019.01)

(52) U.S. Cl.
   CPC ........ *H04L 67/306* (2013.01); *G06F 16/9558* (2019.01); *G06F 16/9566* (2019.01); *H04L 67/1097* (2013.01)

(58) Field of Classification Search
   None
   See application file for complete search history.

(56) References Cited

U.S. PATENT DOCUMENTS

| | | | |
|---|---|---|---|
| 2013/0301820 A1* | 11/2013 | Williams | H04M 3/42195 379/201.01 |
| 2014/0040368 A1* | 2/2014 | Janssens | H04L 67/306 709/204 |
| 2014/0066044 A1* | 3/2014 | Ramnani | H04L 67/306 455/418 |
| 2014/0082074 A1* | 3/2014 | Workman | H04L 67/10 709/204 |
| 2014/0108289 A1* | 4/2014 | Eitan | G06Q 50/01 705/342 |
| 2014/0126825 A1* | 5/2014 | Luo | G06Q 10/10 382/190 |
| 2014/0188991 A1* | 7/2014 | Dhara | H04L 67/306 709/204 |
| 2015/0189028 A1* | 7/2015 | Sayed | H04W 4/21 709/204 |

* cited by examiner

*Primary Examiner* — Natisha D Cox
(74) *Attorney, Agent, or Firm* — Daniel N. Smith

(57) ABSTRACT

An electronic interactive business card system for mobile devices that provides electronic cards that contain direct contact links for the card owner's phone numbers, addresses, websites, and social media webpages. These cards can only be exchanged with approval of the original card owner. The system includes a central server for storing and automatically updating all electronic business cards to keep all cardholders and recipients completely updated on all their card contact information.

19 Claims, 7 Drawing Sheets

ELECTRONIC INTERACTIVE BUSINESS CARD MOBILE SOFTWARE SYSTEM WITH CUSTOMER RELATIONSHIP MANAGEMENT DATABASE

CROSS REFERENCE TO RELATED APPLICATION

This application claims the benefit of U.S. Provisional Patent Application No. 62/046,252, filed on Sep. 5, 2014, and is a continuation-in-part of, and claims priority to, U.S. patent application Ser. No. 14/848,320, filed on Sep. 8, 2015, now U.S. Pat. No. 10,270,880, issued Apr. 23, 2019, the contents of which are incorporated herein by reference.

FIELD OF THE INVENTION

This invention relates to an electronic interactive business card system for mobile devices that provides electronic cards that contain direct contact links for the card owners.

BACKGROUND OF INVENTION

Business owners and their employees have traditionally provided their contact information with potential customers, and other business representatives, through the exchange of physical printed business cards. In addition, business owners and their employees often desire to send contact information to a recipient via an electronic communication method, such as electronic mail, short message service (SMS), HyperText Transfer Protocol (HTTP), or social media posting.

However, potential customers, or business representatives may give and or receive too many printed or e-mailed business cards over the course of a given time period. Many card recipients may attempt to organize these cards in a physical rolodex, or store them electronically on various computer mediums, including mobile smartphones. Electronic storage of these cards may be tedious as it requires entry of the card data by hand, or scanning each card individually into an electronic business card contacts program. The contact information may be entered or scanned incorrectly into the contact program.

A recipient may also lose electronic business cards due to loss, malfunction, or replacement of the recipient's mobile device. A recipient may need a backup of the electronic business cards of the recipient's personal and business contacts to retrieve the electronic business cards back on the mobile device of the user.

Furthermore, physical or electronic storage of business card contact information does not provide the recipient with automated means for updating the card contact information with new or updated information.

In addition, business owners and their employees often do not have methods of tracking, or approving whom a card recipient may forward their contact information too. A card recipient may forward the contact information to multiple secondary contacts that may forward the contact information to multiple tertiary contacts, and so on. Tracking of this information may provide valuable business or networking leads.

Approving each business card exchange to secondary, or tertiary recipients, may also prevent problems with privacy and/or unwanted contact. For example, unapproved contact details from a business card for a prominent individual may allow others to harass the individual. Uncontrolled business cards may also be used to send spam communications and/or make unsolicited contact. In addition, personal and/or contact details from an electronic business card may be used to commit identity theft or other types of fraud.

Finally, with the explosion of social media, many businesses have too much valuable contact and networking information that can be adequately stored on one card. Contact information on these cards is no longer limited to a name, email address, mailing address, title, organization, phone number, and website. Contact information may also include, but is not limited to: website profile pages, marketing websites, LinkedIn® webpages, Twitter® usernames, and Facebook® webpages. This on-line social media contact information may be cumbersome for recipients to enter manually into a contacts system.

Accordingly, the subject invention provides an electronic interactive business card system for mobile devices that provides electronic cards that contain direct contact links for the card owner's phone numbers, addresses, websites, and social media webpages. These cards can only be exchanged with approval of the original card owner. There is also a need for the system for storing the electronic business cards of the recipient's business contacts on a central server as a backup means. All of this information is automatically updated within the system to keep the card recipient completely updated on all their card contact information.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a method of substantial real time exchange of interactive profile information between an originator mobile device and at least one recipient mobile device, comprising the steps of: providing an interactive profile comprising a plurality of identifying information links on a host server comprising executable software, a data storage device, and at least one central database; providing network access to the interactive profile on the originator mobile device; selecting a first portion of the plurality of identifying information links of the interactive profile to share with the recipient mobile device on the originator mobile device; receiving a request from the originator mobile device to share the selected first portion of plurality of identifying information links of the interactive profile with the recipient mobile device; generating and transmitting a sharing link for the selected first portion of plurality of identifying information links of the interactive profile to the recipient mobile device that initiates a request on the recipient mobile device to access the sharing link and accept the selected first portion of plurality of identifying information links of the interactive profile; receiving an acceptance from the recipient mobile device to receive the selected first portion of plurality of identifying information links of the interactive profile; transmitting the selected first portion of plurality of identifying information links of the interactive profile to the recipient mobile device using the host server; transmitting a notification to the originator mobile device that the selected first portion of plurality of identifying information links of the interactive profile has been transmitted to the recipient mobile device using the host server; and storing identification of the recipient mobile device and the time of transmission of the selected first portion of plurality of identifying information links of the interactive profile to the recipient mobile device in the central database for access by the originator mobile device.

In embodiments of the subject invention, the method further includes the steps of: receiving a request from the recipient mobile device to share the selected first portion of plurality of identifying information links of the interactive profile with a second recipient mobile device; generating and transmitting the request from the recipient mobile device to share the selected first portion of plurality of identifying information links of the interactive profile with the second recipient mobile device to the originator mobile device; selecting a second portion of the plurality of identifying information links of the interactive profile from the selected first portion of plurality of identifying information links to share with the second recipient mobile device on the originator mobile device; generating and transmitting a second sharing link for the second portion of the plurality of identifying information links of the interactive profile to the originator mobile device that initiates a request on the originator mobile device to access the second sharing link and accept transmission of the second portion of the plurality of identifying information links of the interactive profile to the second recipient mobile device; receiving an acceptance from the originator mobile device to transmit the second portion of the plurality of identifying information links of the interactive profile to the second recipient mobile device; generating and transmitting a third sharing link for the second portion of the plurality of identifying information links of the interactive profile to the second recipient mobile device that initiates a request on the second recipient mobile device to access the third sharing link and accept the second portion of the plurality of identifying information links of the interactive profile; receiving an acceptance from the second recipient mobile device to receive the second portion of the plurality of identifying information links of the interactive profile; transmitting the second portion of the plurality of identifying information links of the interactive profile to the second recipient mobile device using the host server; transmitting a notification to the originator mobile device that the second portion of the plurality of identifying information links of the interactive profile has been transmitted to the second recipient mobile device using the host server; and storing identification of the second recipient mobile device and the time of transmission of the second portion of the plurality of identifying information links of the interactive profile to the second recipient mobile device in the central database for access by the originator mobile device.

In other embodiments of the subject invention, the method further includes the steps of: receiving a request from the second recipient mobile device to share the selected second portion of plurality of identifying information links of the interactive profile with a third recipient mobile device; generating and transmitting the request from the second recipient mobile device to share the selected second portion of plurality of identifying information links of the interactive profile with the third recipient mobile device to the originator mobile device; selecting a third portion of the plurality of identifying information links of the interactive profile from the selected second portion of plurality of identifying information links to share with the third recipient mobile device on the originator mobile device; generating and transmitting a fourth sharing link for the third portion of the plurality of identifying information links of the interactive profile to the originator mobile device that initiates a request on the originator mobile device to access the fourth sharing link and accept transmission of the third portion of the plurality of identifying information links of the interactive profile to the third recipient mobile device; receiving an acceptance from the originator mobile device to transmit the third portion of the plurality of identifying information links of the interactive profile to the third recipient mobile device; generating and transmitting a fifth sharing link for the third portion of the plurality of identifying information links of the interactive profile to the third recipient mobile device that initiates a request on the third recipient mobile device to access the fifth sharing link and accept the third portion of the plurality of identifying information links of the interactive profile; receiving an acceptance from the third recipient mobile device to receive the third portion of the plurality of identifying information links of the interactive profile; transmitting the third portion of the plurality of identifying information links of the interactive profile to the third recipient mobile device using the host server; transmitting a notification to the originator mobile device that the third portion of the plurality of identifying information links of the interactive profile has been transmitted to the third recipient mobile device using the host server; and storing identification of the third recipient mobile device and the time of transmission of the third portion of the plurality of identifying information links of the interactive profile to the third recipient mobile device in the central database for access by the originator mobile device.

In additional embodiments of the subject invention, the method further includes the steps of: receiving a request from an N recipient mobile device to share the selected N portion of plurality of identifying information links of the interactive profile with a N+1 recipient mobile device; generating and transmitting the request from the N recipient mobile device to share the selected N portion of plurality of identifying information links of the interactive profile with the N+1 recipient mobile device to the originator mobile device; selecting an N+1 portion of the plurality of identifying information links of the interactive profile from the selected N portion of plurality of identifying information links to share with the N+1 recipient mobile device on the originator mobile device; generating and transmitting an N sharing link for the N+1 portion of the plurality of identifying information links of the interactive profile to the originator mobile device that initiates a request on the originator mobile device to access the N sharing link and accept transmission of the N+1 portion of the plurality of identifying information links of the interactive profile to the N+1 recipient mobile device; receiving an acceptance from the originator mobile device to transmit the N+1 portion of the plurality of identifying information links of the interactive profile to the N+1 recipient mobile device; generating and transmitting an N+1 sharing link for the N+1 portion of the plurality of identifying information links of the interactive profile to the N+1 recipient mobile device that initiates a request on the N+1 recipient mobile device to access the third sharing link and accept the N+1 portion of the plurality of identifying information links of the interactive profile; receiving an acceptance from the N+1 recipient mobile device to receive the N+1 portion of the plurality of identifying information links of the interactive profile; transmitting the N+1 portion of the plurality of identifying information links of the interactive profile to the N+1 recipient mobile device using the host server; transmitting a notification to the originator mobile device that the N+1 portion of the plurality of identifying information links of the interactive profile has been transmitted to the N+1 recipient mobile device using the host server; and storing identification of the N+1 recipient mobile device and the time of transmission of the N+1 portion of the plurality of identifying information links of the interactive profile to the N+1 recipient mobile device in the central database for access by the originator mobile device.

The subject invention also discloses a method of substantial real time exchange of interactive profile information between an originator mobile device and N recipient mobile devices, comprising the steps of: providing an interactive profile comprising a plurality of identifying information links on a host server comprising executable software, a data storage device, and at least one central database; providing network access to the interactive profile on the originator mobile device; selecting an N portion of the plurality of identifying information links of the interactive profile to share with N recipient mobile devices on the originator mobile device; receiving a request from the originator mobile device to share the selected N portion of plurality of identifying information links of the interactive profile with the N recipient mobile devices; generating and transmitting an N sharing link for the selected N portion of plurality of identifying information links of the interactive profile to the N recipient mobile devices that initiates a request on the N recipient mobile devices to access the N sharing link and accept the selected N portion of plurality of identifying information links of the interactive profile; receiving an acceptance from the N recipient mobile devices to receive the selected N portion of plurality of identifying information links of the interactive profile; transmitting the selected N portion of plurality of identifying information links of the interactive profile to the N recipient mobile devices using the host server; transmitting a notification to the originator mobile device that the selected N portion of plurality of identifying information links of the interactive profile has been transmitted to the N recipient mobile devices using the host server; storing identification of the N recipient mobile devices and the times of transmission of the selected N portion of plurality of identifying information links of the interactive profile to the N recipient mobile devices in the central database for access by the originator mobile device; receiving a request on the host server from an N recipient mobile device to share the selected N portion of plurality of identifying information links of the interactive profile with a N+1 recipient mobile devices; generating and transmitting the request from the N recipient mobile device to share the selected N portion of plurality of identifying information links of the interactive profile with the N+1 recipient mobile devices to the originator mobile device; selecting an N+1 portion of the plurality of identifying information links of the interactive profile from the selected N portion of plurality of identifying information links to share with the N+1 recipient mobile devices on the originator mobile device; generating and transmitting an N+1 sharing link for the N+1 portion of the plurality of identifying information links of the interactive profile to the originator mobile device that initiates a request on the originator mobile device to access the N+1 sharing link and accept transmission of the N+1 portion of the plurality of identifying information links of the interactive profile to the N+1 recipient mobile devices; receiving an acceptance from the originator mobile device to transmit the N+1 portion of the plurality of identifying information links of the interactive profile to the N+1 recipient mobile devices; generating and transmitting an N+2 sharing link for the N+1 portion of the plurality of identifying information links of the interactive profile to the N+1 recipient mobile devices that initiates a request on the N+1 recipient mobile devices to access the N+2 sharing link and accept the N+1 portion of the plurality of identifying information links of the interactive profile; receiving an acceptance from the N+1 recipient mobile devices to receive the N+1 portion of the plurality of identifying information links of the interactive profile; transmitting the N+1 portion of the plurality of identifying information links of the interactive profile to the N+1 recipient mobile devices using the host server; transmitting a notification to the originator mobile device that the N+1 portion of the plurality of identifying information links of the interactive profile has been transmitted to the N+1 recipient mobile devices using the host server; and storing identification of the N+1 recipient mobile devices and the times of transmission of the N+1 portion of the plurality of identifying information links of the interactive profile to the N+1 recipient mobile devices in the central database for access by the originator mobile device.

Another embodiment of the subject invention discloses a method of substantial real time exchange of interactive profile information between an originator mobile device and N recipient mobile devices, comprising the steps of: providing an interactive profile comprising a plurality of identifying information links on a host server comprising executable software, a data storage device, and at least one central database; providing network access to the interactive profile on the originator mobile device; selecting an N portion of the plurality of identifying information links of the interactive profile to share with N recipient mobile devices on the originator mobile device; receiving a request from the originator mobile device to share the selected N portion of plurality of identifying information links of the interactive profile with the N recipient mobile devices; generating and transmitting an N sharing link for the selected N portion of plurality of identifying information links of the interactive profile to the N recipient mobile devices that initiates a request on the N recipient mobile devices to access the N sharing link and accept the selected N portion of plurality of identifying information links of the interactive profile; receiving an acceptance from the N recipient mobile devices to receive the selected N portion of plurality of identifying information links of the interactive profile; transmitting the selected N portion of plurality of identifying information links of the interactive profile to the N recipient mobile devices using the host server; transmitting a notification to the originator mobile device that the the selected N portion of plurality of identifying information links of interactive profile has been transmitted to the N recipient mobile devices using the host server; storing identification of the N recipient mobile devices and the times of transmission of the selected N portion of plurality of identifying information links of the interactive profile to the N recipient mobile devices in the central database for access by the originator mobile device; receiving a request on the host server from an N recipient mobile device to share the selected N portion of plurality of identifying information links of the interactive profile with a N+1 recipient mobile devices; generating and transmitting the request from the N recipient mobile device to share the selected N portion of plurality of identifying information links of the interactive profile with the N+1 recipient mobile devices to the originator mobile device; selecting an N+1 portion of the plurality of identifying information links of the interactive profile from the selected N portion of plurality of identifying information links to share with the N+1 recipient mobile devices on the originator mobile device; generating and transmitting an N+1 sharing link for the N+1 portion of the plurality of identifying information links of the interactive profile to the N+1 recipient mobile devices that initiates a request on the N+1 recipient mobile devices to access the N+1 sharing link and accept the N+1 portion of the plurality of identifying information links of the interactive profile; receiving an acceptance from the N+1 recipient mobile devices to receive the N+1 portion of the plurality of identifying information links of the interactive profile; transmitting the N+1 portion of the plurality of identifying information links of the interactive profile to the N+1 recipient mobile devices using the host server; transmitting a notification to the originator mobile device that the N+1 portion of the plurality of identifying information links of the interactive profile has been transmitted to the N+1 recipient mobile devices using the host server; and storing identification of the N+1 recipient mobile devices and the times of transmission of the N+1 portion of the plurality of identifying information links of the interactive profile to the N+1 recipient mobile devices in the central database for access by the originator mobile device.

The subject invention discloses a method of substantial real time exchange of interactive profile information between an originator mobile device and a plurality of recipient mobile devices, comprising the steps of: providing an interactive profile comprising a plurality of identifying information links on a host server comprising executable software, a data storage device, and at least one central database; providing network access to the interactive profile on the originator mobile device; selecting a first portion of the plurality of identifying information links of the interactive profile to share with the plurality of recipient mobile devices on the originator mobile device; receiving a request from the originator mobile device to share the selected first portion of plurality of identifying information links of the interactive profile with the plurality of recipient mobile devices; generating and transmitting a sharing link for the selected first portion of plurality of identifying information links of the interactive profile to the plurality of recipient mobile devices that initiates a request on the plurality of recipient mobile devices to access the sharing link and accept the selected first portion of plurality of identifying information links of the interactive profile; receiving an acceptance from the plurality of recipient mobile devices to receive the selected first portion of plurality of identifying information links of the interactive profile; transmitting the selected first portion of plurality of identifying information links of the interactive profile to the plurality of recipient mobile devices using the host server; transmitting a notification to the originator mobile device that the selected first portion of plurality of identifying information links of the interactive profile has been transmitted to the plurality of recipient mobile devices using the host server; and storing identification of the plurality of recipient mobile devices and the time of transmission of the selected first portion of plurality of identifying information links of the interactive profile to the plurality of recipient mobile devices in the central database for access by the originator mobile device.

In embodiments of the subject invention, the method further includes the steps of: receiving a request from one of the plurality of recipient mobile devices to share the selected first portion of plurality of identifying information links of the interactive profile with a second plurality of recipient mobile devices; generating and transmitting the request from the one of the plurality of recipient mobile devices to share the selected first portion of plurality of identifying information links of the interactive profile with the second plurality of recipient mobile devices to the originator mobile device; selecting a second portion of the plurality of identifying information links of the interactive profile from the selected first portion of plurality of identifying information links to share with the second plurality of recipient mobile devices on the originator mobile device; generating and transmitting a second sharing link for the second portion of the plurality of identifying information links of the interactive profile to the originator mobile device that initiates a request on the originator mobile device to access the second sharing link and accept transmission of the second portion of the plurality of identifying information links of the interactive profile to the second plurality of recipient mobile devices; receiving an acceptance from the originator mobile device to transmit the second portion of the plurality of identifying information links of the interactive profile to the second plurality of recipient mobile devices; generating and transmitting a third sharing link for the second portion of the plurality of identifying information links of the interactive profile to the second plurality of recipient mobile devices that initiates a request on the second plurality of recipient mobile devices to access the third sharing link and accept the second portion of the plurality of identifying information links of the interactive profile; receiving an acceptance from the second plurality of recipient mobile devices to receive the second portion of the plurality of identifying information links of the interactive profile; transmitting the second portion of the plurality of identifying information links of the interactive profile to the second plurality of recipient mobile devices using the host server; transmitting a notification to the originator mobile device that the second portion of the plurality of identifying information links of the interactive profile has been transmitted to the second plurality of recipient mobile devices using the host server; and storing identification of the second plurality of recipient mobile devices and the time of transmission of the second portion of the plurality of identifying information links of the interactive profile to the second plurality of recipient mobile devices in the central database for access by the originator mobile device.

The subject invention also discloses a method of substantial real time exchange of interactive profile information between an originator mobile device and at least one recipient mobile device, comprising the steps of: providing an interactive profile on a host server comprising executable software, a data storage device, and at least one central database; providing network access to the interactive profile on the originator mobile device; receiving a request from the originator mobile device to share the interactive profile with the recipient mobile device; generating and transmitting an identification code for the interactive profile to the recipient mobile device that initiates a request on the recipient mobile device to accept the interactive profile; receiving an acceptance from the recipient mobile device to receive the interactive profile; transmitting the interactive profile to the recipient mobile device using the host server; transmitting a notification to the originator mobile device that the interactive profile has been transmitted to the recipient mobile device using the host server; and storing identification of the recipient mobile device and the time of transmission of the interactive profile to the recipient mobile device in the central database for access by the originator mobile device.

A further embodiment of the subject invention comprises the steps of: receiving a request from the recipient mobile device to share the interactive profile with a second recipient mobile device; generating and transmitting an identification code for the interactive profile to the originator mobile device that initiates a request on the originator mobile device to accept transmission of the interactive profile to the second recipient mobile device; receiving an acceptance from the originator mobile device to transmit the interactive profile to the second recipient mobile device; generating and transmitting an identification code for the interactive profile to the second recipient mobile device that initiates a request on the second recipient mobile device to accept the interactive profile; receiving an acceptance from the second recipient mobile device to receive the interactive profile; transmitting the interactive profile to the second recipient mobile device using the host server; transmitting a notification to the originator mobile device that the interactive profile has been transmitted to the second recipient mobile device using the host server; and storing identification of the second recipient mobile device and the time of transmission of the interactive profile to the second recipient mobile device in the central database for access by the originator mobile device.

A further embodiment of the subject invention comprises the steps of: receiving a request from the second recipient mobile device to share the interactive profile with a third recipient mobile device; generating and transmitting an identification code for the interactive profile to the originator mobile device that initiates a request on the originator mobile device to accept transmission of the interactive profile to the third recipient mobile device; receiving an acceptance from the originator mobile device to transmit the interactive profile to the third recipient mobile device; generating and transmitting an identification code for the interactive profile to the third recipient mobile device that initiates a request on the third recipient mobile device to accept the interactive profile; receiving an acceptance from the third recipient mobile device to receive the interactive profile; transmitting the interactive profile to the third recipient mobile device using the host server; transmitting a notification to the originator mobile device that the interactive profile has been transmitted to the third recipient mobile device using the host server; and storing identification of the third recipient mobile device and the time of transmission of the interactive profile to the third recipient mobile device in the central database for access by the originator mobile device.

A further embodiment of the subject invention comprises the steps of: receiving a request from an N recipient mobile device to share the interactive profile with a N+1 recipient mobile device; generating and transmitting an identification code for the interactive profile to the originator mobile device that initiates a request on the originator mobile device to accept transmission of the interactive profile to the N+1 recipient mobile device; receiving an acceptance from the originator mobile device to transmit the interactive profile to the N+1 recipient mobile device; generating and transmitting an identification code for the interactive profile to the N+1 recipient mobile device that initiates a request on the N+1 recipient mobile device to accept the interactive profile; receiving an acceptance from the N+1 recipient mobile device to receive the interactive profile; transmitting the interactive profile to the N+1 recipient mobile device using the host server; transmitting a notification to the originator mobile device that the interactive profile has been transmitted to the N+1 recipient mobile device using the host server; and storing identification of the N+1 recipient mobile device and the time of transmission of the interactive profile to the N+1 recipient mobile device in the central database for access by the originator mobile device.

The subject invention further discloses a method of substantial real time exchange of interactive profile information between an originator mobile device and N recipient mobile devices, comprising the steps of: providing an interactive profile on a host server comprising executable software, a data storage device, and at least one central database; providing network access to the interactive profile on the originator mobile device; receiving a request from the originator mobile device to share the interactive profile with the N recipient mobile devices; generating and transmitting an identification code for the interactive profile to the N recipient mobile devices that initiates a request on the N recipient mobile devices to accept the interactive profile; receiving an acceptance from the N recipient mobile devices to receive the interactive profile; transmitting the interactive profile to the N recipient mobile devices and permission to share the interactive profile with a N+1 recipient mobile devices using the host server; transmitting a notification to the originator mobile device that the interactive profile has been transmitted to the N recipient mobile devices using the host server; storing identification of the N recipient mobile devices and the times of transmission of the interactive profile to the N recipient mobile devices in the central database for access by the originator mobile device; receiving a request on the host server from an N recipient mobile device to share the interactive profile with a N+1 recipient mobile devices; generating and transmitting an identification code for the interactive profile to the originator mobile device that initiates a request on the originator mobile device to accept transmission of the interactive profile to the N+1 recipient mobile devices; receiving an acceptance from the originator mobile device to transmit the interactive profile to the N+1 recipient mobile devices; generating and transmitting an identification code for the interactive profile to the N+1 recipient mobile devices that initiates a request on the N+1 recipient mobile devices to accept the interactive profile; receiving an acceptance from the N+1 recipient mobile devices to receive the interactive profile; transmitting the interactive profile to the N+1 recipient mobile devices and permission to share the interactive profile with a N+2 recipient mobile devices using the host server; transmitting a notification to the originator mobile device that the interactive profile has been transmitted to the N+1 recipient mobile devices using the host server; and storing identification of the N+1 recipient mobile devices and the times of transmission of the interactive profile to the N+1 recipient mobile devices in the central database for access by the originator mobile device.

The subject invention also discloses a method of substantial real time exchange of interactive profile information between an originator mobile device and N recipient mobile devices, comprising the steps of: providing an interactive profile on a host server comprising executable software, a data storage device, and at least one central database; providing network access to the interactive profile on the originator mobile device; receiving a request from the originator mobile device to share the interactive profile with the N recipient mobile devices; generating and transmitting an identification code for the interactive profile to the N recipient mobile devices that initiates a request on the N recipient mobile devices to accept the interactive profile; receiving an acceptance from the N recipient mobile devices to receive the interactive profile; transmitting the interactive profile to the N recipient mobile devices and permission to share the interactive profile with a N+1 recipient mobile devices using the host server; transmitting a notification to the originator mobile device that the interactive profile has been transmitted to the N recipient mobile devices using the host server; storing identification of the N recipient mobile devices and the times of transmission of the interactive profile to the N recipient mobile devices in the central database for access by the originator mobile device; receiving a request on the host server from an N recipient mobile device to share the interactive profile with a N+1 recipient mobile devices; generating and transmitting an identification code for the interactive profile to the N+1 recipient mobile devices that initiates a request on the N+1 recipient mobile devices to accept the interactive profile; receiving an acceptance from the N+1 recipient mobile devices to receive the interactive profile; transmitting the interactive profile to the N+1 recipient mobile devices and permission to share the interactive profile with a N+2 recipient mobile devices using the host server; transmitting a notification to the originator mobile device that the interactive profile has been transmitted to the N+1 recipient mobile devices using the host server; and storing identification of the N+1 recipient mobile devices and the times of transmission of the interactive profile to the N+1 recipient mobile devices in the central database for access by the originator mobile device.

In embodiments of the subject invention, the rejection of the request from the recipient mobile device to accept the interactive profile is transmitted to the originator mobile device, and the time of rejection is stored in the central database for access by the originator mobile device.

In embodiments of the subject invention, the rejection of the request to accept transmission of the interactive profile to the second recipient mobile device from the originator mobile device is stored in the central database for access by the originator mobile device.

In embodiments of the subject invention, the originator mobile device prevents sharing of the interactive profile from the second recipient mobile device to any other recipient mobile device.

In embodiments of the subject invention, the originator mobile device allows free sharing of the interactive profile from the second recipient mobile device to any other recipient mobile device, wherein any sharing of the interactive profile from the second recipient mobile device stores identification of all recipient mobile devices and the times of transmission to the central database for access by the originator mobile device.

In embodiments of the subject invention, any updates to the interactive profile are automatically updated to all recipient mobile devices in substantial real time from the central database.

In embodiments of the subject invention, the interactive profile comprises at least one on-line link to a third-party URL designated by the originator for direct access through a mobile browser software on the recipient mobile device.

In embodiments of the subject invention, the interactive profile comprises at least one link to a phone number designated by the originator for direct access through a mobile phone system on the recipient mobile device.

In embodiments of the subject invention, the interactive profile comprises at least pre-recorded audio or video message from the originator for direct access through an audio or video playback software on the recipient mobile device. In embodiments of the subject invention, users have the ability to record, playback, or listen to previous audio messages.

There has thus been outlined, rather broadly, the more important features of the invention in order that the detailed description of an improved toddler gate. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of exemplary embodiments thereof; which description should be considered in conjunction with the accompanying drawings.

DETAILED DESCRIPTION OF EMBODIMENTS

While several variations of the present invention have been illustrated by way of example in particular embodiments, it is apparent that further embodiments could be developed within the spirit and scope of the present invention. However, it is to be expressly understood that such modifications and adaptations are within the spirit and scope of the present invention, and are inclusive, but not limited to the following appended claims as set forth.

The subject invention discloses a downloadable software application or on-line web application for mobile smartphones, tablet devices, laptops, or desktop computers. This system allows an individual to share their electronic interactive business card with associates, sales leads, and other business and personal contact relationships. A user may share the card with another individual by simply typing in their name, email address, and mobile phone number.

The invention achieves these objectives by providing one or more host servers and central databases residing within the host servers; a means for uploading and downloading data from a plurality of mobile devices; a means for organizing all the uploaded data into the central databases; a means for running specific search queries from a plurality of mobile devices; and a means for displaying the interactive business cards on the mobile devices.

Figure 6:
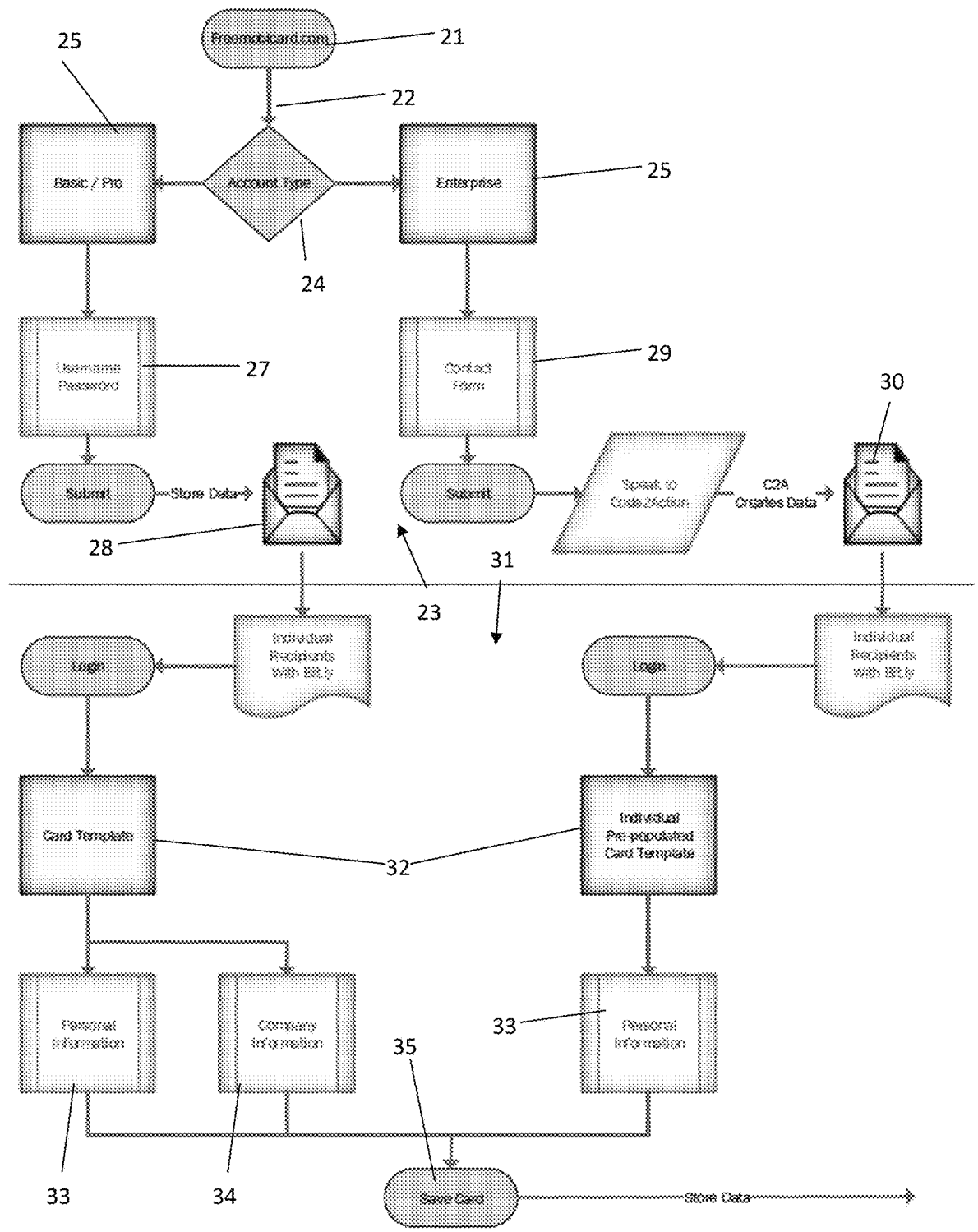
FIG. 6 is a flowchart depicting account registration and electronic business card creation.

As illustrated in FIG. 6, a user may download and install the mobile software from a host website 21 via a network 22. Alternatively, a user may use the software through an on-line software web application from a host website 21 via a network 22. The mobile software will work on different technological platforms and operating systems, for example, iPhone, Android, Java, Windows, Mac, and Linux.

Figure 1:
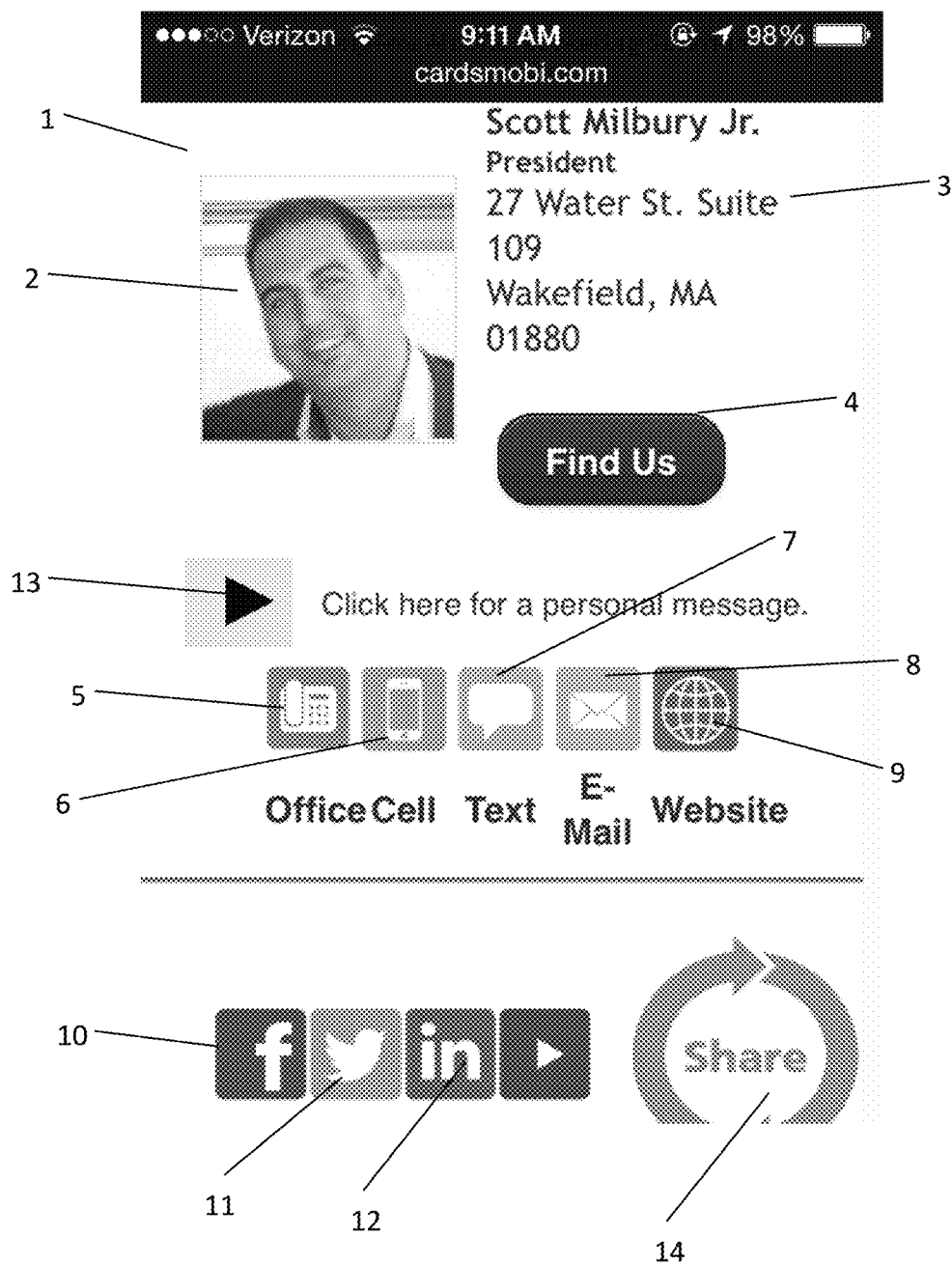
FIG. 1 is a mobile screenshot of a graphical user interface screen of the subject invention.

This software application allows a user to build an electronic interactive business card 1, as illustrated in FIG. 1. In the first step, account registration 23, the user selects an account type 24 at either a basic or professional level 25, or enterprise level 26. A user selects a username and password 27 for submission and storage 28. At the enterprise level 26, a user will submit contact information 29 for submission and creation of enterprise level data 30.

In the second step, electronic business card creation 31, the system may provide one or more templates 32 for designing the electronic business card that includes data entry fields allowing a user to upload personal 33 and company information 34, including, but not limited to: a personal image, a business image, a trademark, a logo, name, address(es), address URL links, phone number(s), fax number(s), e-mail addresses(s), website links, social media links, and social media tags. A user may build their business card directly on the mobile device or through an on-line portal over a network that will transfer the completed card to the mobile device. Once the electronic business card 1 is created, it is saved 35 to the system servers.

Once the electronic card 1 is created, the card owner will receive their version of the card to their mobile device. The card owner's version of the card may contain several features and functionalities that are not available with the shared versions of the card such as buttons to update their personal audio message, viewing statistics, and making a card owners "top-level" share.

In the embodiment of the electronic business card illustrated in FIG. 1, the card 1 displays: an image 2; name and address information 3; a touch-activated button 4 that activates a link to an on-line map of the address on the user's mobile device; a touch-activated office number button 5 that activates the calling function on the user's mobile device directly to the office number; a touch-activated cell number button 6 that activates the calling function on the user's mobile device directly to the cell number; a touch-activated text button 7 that activates the SMS texting function on the user's mobile device directly to the cell number; a touch-activated e-mail button 8 that activates the e-mail function on the user's mobile device directly to the e-mail; a touch-activated website button 9 that activates an internet browser on the user's mobile device directly to the contact website; a touch-activated Facebook® button 10 that activates an internet browser or the Facebook® mobile application on the user's mobile device directly to the contact Facebook® webpage; a touch-activated Twitter® button 11 that activates an internet browser or the Twitter® mobile application on the user's mobile device directly to the contact Twitter® webpage; a touch-activated LinkedIn® button 12 that activates an internet browser or the LinkedIn® mobile application on the user's mobile device directly to the contact LinkedIn® webpage; and a touch-activated personal message button 13 that activates an audio or video mobile application on the user's mobile device to playback a recorded audio or video message from the contact.

Figure 2:
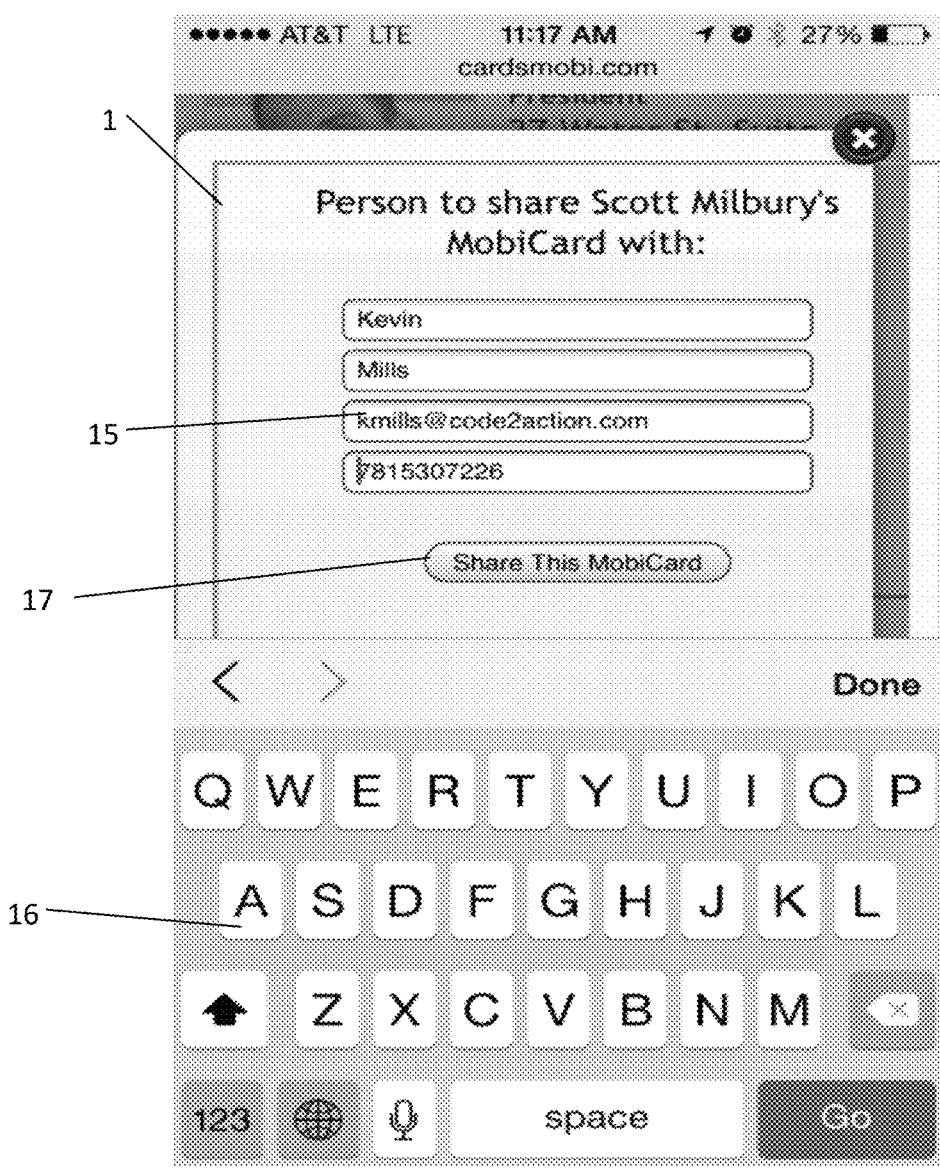
FIG. 2 is a mobile screenshot of another graphical user interface screen of the subject invention.
Figure 3:
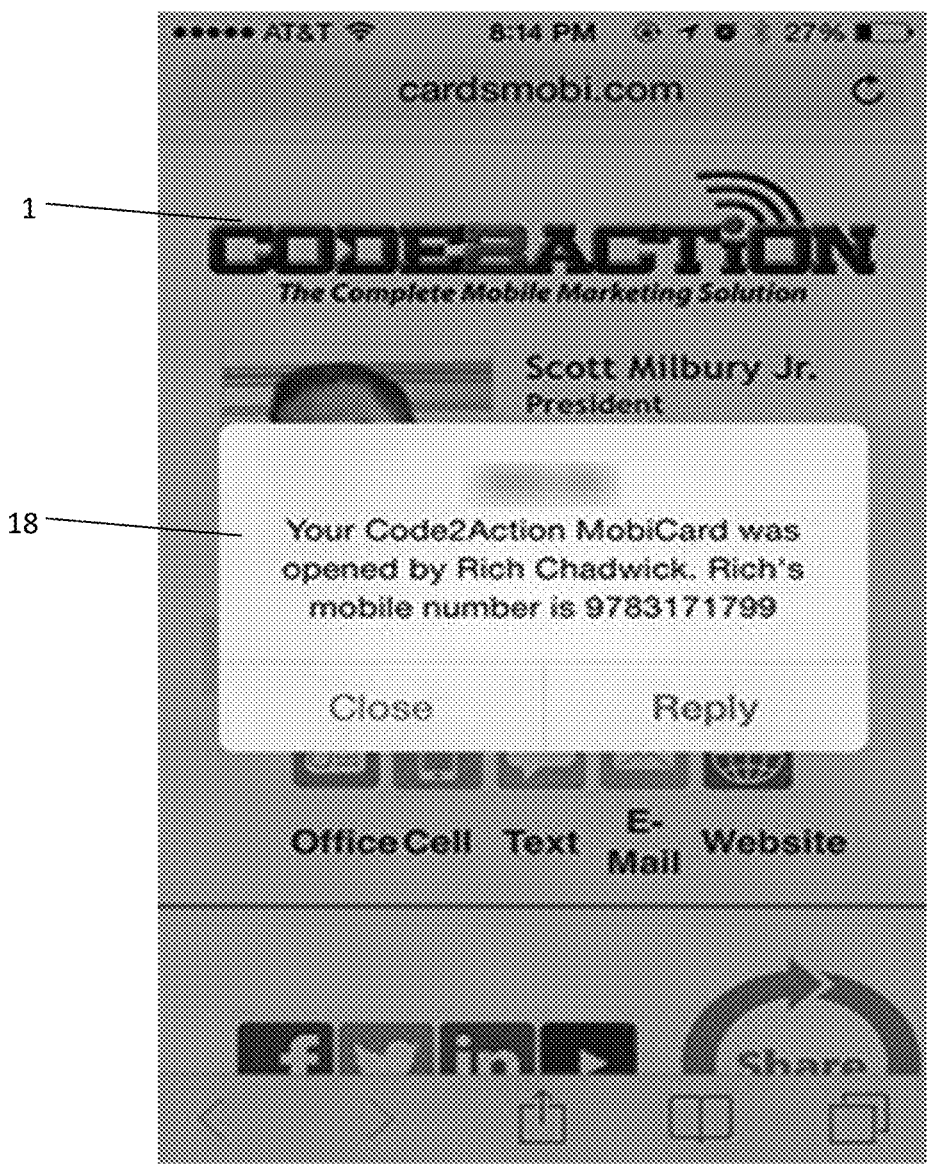
FIG. 3 is a mobile screenshot of another graphical user interface screen of the subject invention.
Figure 7:
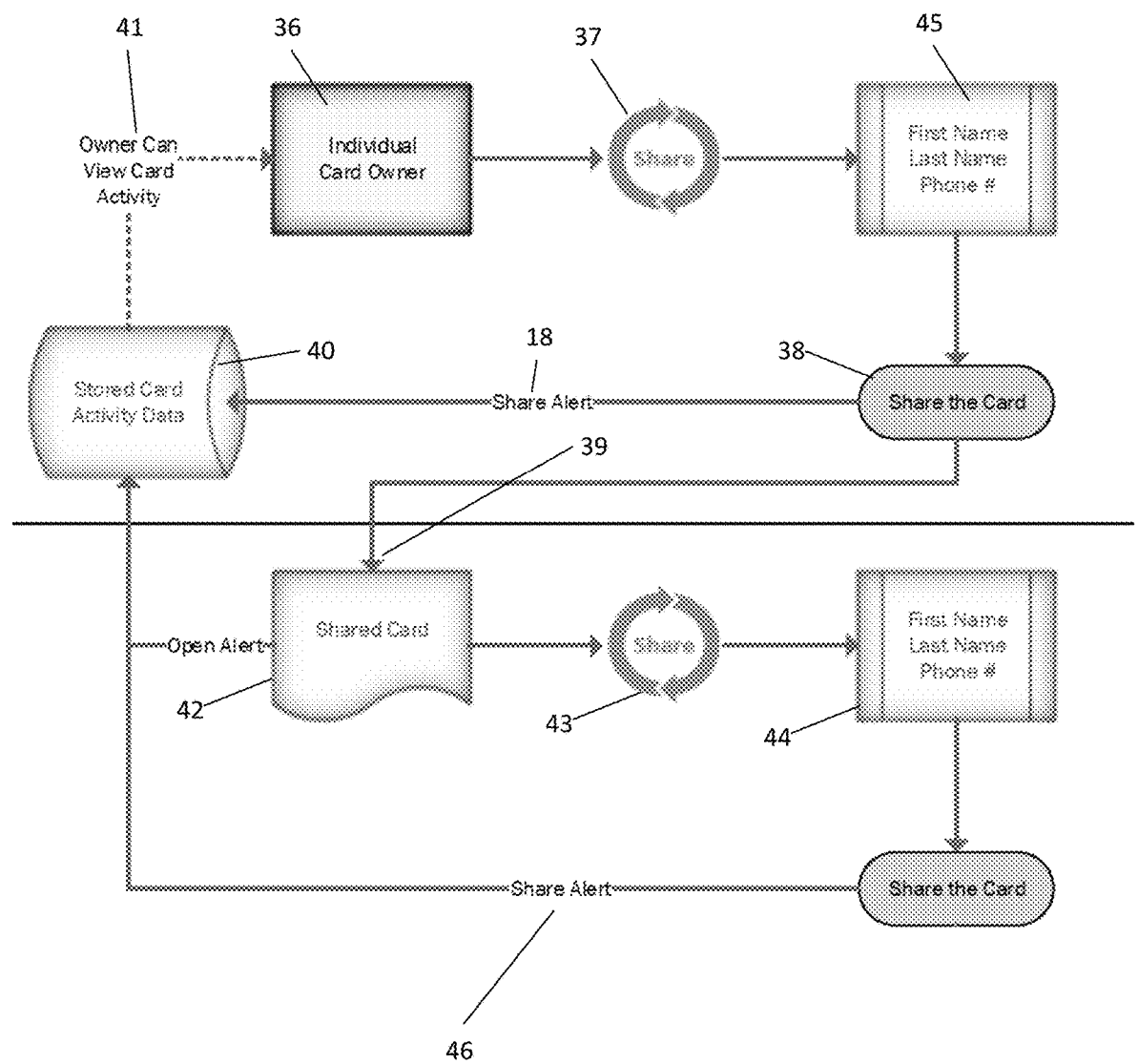
FIG. 7 is a flowchart depicting the electronic business card sharing system.

As illustrated in FIGS. 1 and 7, the card owner 36 may share 37 the card with a recipient by first pressing a touch-activated share button 14 on the card 1 display. As illustrated in FIG. 2, pressing the share button displays a plurality of data entry fields 15 and the touch activated keyboard 16 of the mobile device to allow a user to type in a recipient's name, email address, and mobile phone number. Once this information 45 is entered correctly, the user then presses the touch-activated share this card button 17. This button 17 uses the SMS system of the mobile device to share 38 the electronic interactive business card 1 with the intended recipient by SMS text 39. This sharing activity originating from the card owner 36 is stored 40 by the system for viewing 41 by the card owner 36 at any time.

Once the recipient receives the SMS text 39, he or she may open the card 1 on their smart phone or tablet to view it and save a bookmark to their mobile device. In one embodiment of the subject invention, the recipient may also receive an optional secondary text with a personal message from the card owner. In embodiments of the subject invention, the card may be downloaded to each recipient's mobile device as a V-card.

Figure 4:
FIG. 4 is a mobile screenshot of another graphical user interface screen of the subject invention.
Figure 5:
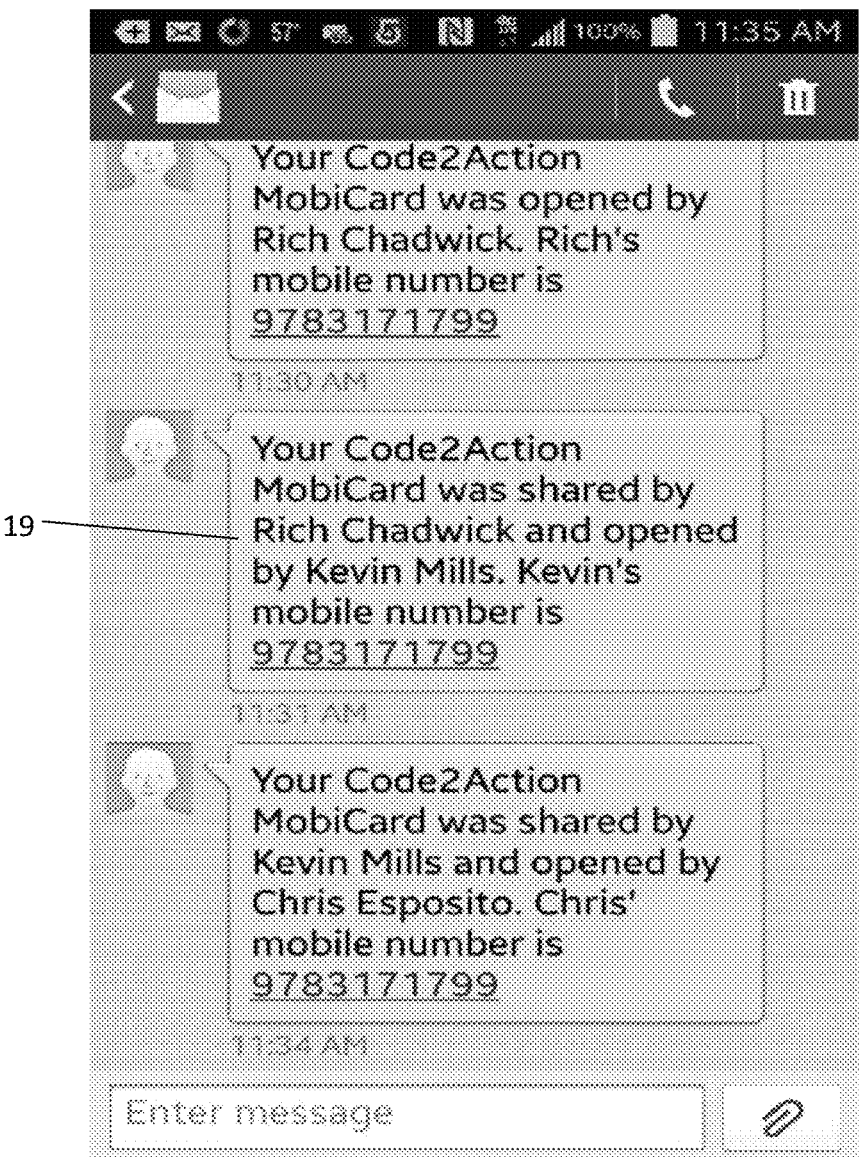
FIG. 5 is a mobile screenshot of another graphical user interface screen of the subject invention.

At the same time, as illustrated in FIGS. 3-5 and 7, the card owner receives a text 19 or a notification 18 to their mobile devices each time a recipient receives, opens, or views their electronic business card. This SMS text 19 may include a name and phone number of the recipient. The "first level" shared card 42 can then be shared 43 with a secondary recipient 44 as a referral with information regarding the sharer and the secondary recipient 44 sent back as a real-time text or notification 46 to the card owner 36. As illustrated in FIGS. 4 and 5, SMS texts 20 and notifications 46 are also forwarded to the card owner when a recipient shares the contact information with a secondary recipient 44.

In further embodiments of the subject invention, the electronic card can be imbedded into a QR code, that can be display or shared.

The information regarding which the card owner has shared their card with, the card views and subsequent sharing activity 40 is logged into a central database. The database allows a card owner to follow up all direct and shared contact via various electronic means (email, text, phone, etc.) either individually or as a group.

In embodiments of the subject invention, the card owner may completely or partially restrict access to recipients on sharing the card with secondary recipients. For example, if a recipient shares the card with a secondary recipient, the system may send an SMS text to the card owner with an activation link, or the system will activate a permissions tab on the card owner's application. If the card owner presses the link or tab, the system will then forward the card to the secondary recipient. If the card owner does not press the activation link or tab, then the secondary recipient shall not receive the card. Alternatively, if a recipient shares the card with a secondary recipient, the system may send an SMS text to the card owner, or the system will activate a permissions tab on the card owner's application, with a link to share a restricted interactive card that does not contain more intrusive contact information such a phone numbers or e-mail addresses, while keeping website links, addresses, and social media pages.

If the business card owner makes changes to the card contact information, this updated information is logged into the central database. All recipients, and second recipients will receive the updated contact information automatically, without the need for uploading the specific card being updated. The automatic updates may be in real time or substantially near real time.

In further embodiments of the system, a card owner may share a public link of their electronic business card to recipients without requiring any system authentication as the analytics are fed in by the owner. The recipient can view the business card immediately without entering any of the details as the system analytics will read what is fed in by the card owner.

In additional embodiments of the system, a recipient may share a public link of the electronic business card with secondary recipients without requiring any system authentication as the analytics are fed in by the original recipient. The secondary recipient can view the business card immediately without entering any of the details as the system analytics will read what is fed in by the recipient.

In additional embodiments of the system, an N recipient may share a public link of the electronic business card with N+1 recipients without requiring any system authentication as the analytics are fed in by the N recipient. The N+1 recipient can view the business card immediately without entering any of the details as the system analytics will read what is fed in by the N recipient.

In further embodiments of the system, a card owner may share a private link of their electronic business card with a group of recipients. Each recipient will have to input their personal information (such as name, e-mail, or phone number) in order to open the private link of the card. This personal information of the recipients will be included in the system analytics.

The system of the subject invention, may be a free system for users, supported by ad revenue running on the graphical user interface screens of the system. The system may also include a paid subscription package.

The system will permit administrators to block inappropriate users, including care owner, and any card recipients.

Architecture of the System

The host servers of the subject invention are computing devices that may include a communication device (such as a bus), a CPU/processor, a main memory, a storage device, and databases interactive card owners and recipients.

The communication device may permit communication between the computing device and the mobile devices. The communication may be over a network such as a wired or wireless network. The network communication may be based on protocols such as Ethernet, IP, TCP, UDP, Bluetooth®, or IEEE 802.11.

Embodiments of the processor unit of the host servers may include processors, microprocessors, multi-core processors, microcontrollers, system-on-chips, field programmable gate arrays (FPGA), application specific integrated circuits (ASIC), application specific instruction-set processors (ASIP), or graphics processing units (GPU). In one embodiment, the processor unit may enable processing logic to interpret and execute instructions.

In a further embodiment, the main memory may store computer retrievable information and software executable instructions. These software executable instructions may be instructions for use by the processor unit. The storage device may computer retrievable information and software executable instructions for use by the processor and may also include a solid state, magnetic, or optical recording medium.

In embodiments of the subject invention, the underlying architecture of the system may be implemented using one or more desktop, laptop, server, or mobile device computer programs, each of which may execute under the control of an operating system, such as Windows, OS2, DOS, AIX, UNIX, MAC OS, iOS, ChromeOS, Android, and Windows Phone or CE.

The software application of the system comprises an HTML-embedded web scripting language Hypertext Preprocessor (PHP) driven by a MySQL database on the backend. The graphical user interface visual elements or the system are created in HTML5/CSS3 using jQuery in combination with PHP dynamic code.

In additional embodiments of the subject invention, data analytics will be implemented to report and analyze card sharing, card usage and views, card activity, audio message usage, and system reporting.

The system may include a master admin portal for managing and tracking all users; tracking all activity, and managing advertisers on the system.

The system may include an Organization admin portal for managing and tracking all users and activity within an Organization's system. This portal will permit the mass importation of a list of users for a specific organization.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

As used in this specification and the appended claims, the singular forms "a," "an," and "the" include plural referents unless the context clearly dictates otherwise.

The term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A method of substantial real time exchange of interactive profile information between an originator mobile device and at least one recipient mobile device, comprising the steps of:

providing an interactive profile comprising a plurality of identifying information links on a host server comprising executable software, a data storage device, and at least one central database;

providing network access to the interactive profile on the originator mobile device;

selecting a first portion of the plurality of identifying information links of the interactive profile to share with the recipient mobile device on the originator mobile device;

receiving a request from the originator mobile device to share the selected first portion of plurality of identifying information links of the interactive profile with the recipient mobile device;

generating and transmitting a sharing link for the selected first portion of plurality of identifying information links of the interactive profile to the recipient mobile device that initiates a request on the recipient mobile device to access the sharing link and accept the selected first portion of plurality of identifying information links of the interactive profile;

receiving an acceptance from the recipient mobile device to receive the selected first portion of plurality of identifying information links of the interactive profile;

transmitting the selected first portion of plurality of identifying information links of the interactive profile to the recipient mobile device using the host server;

transmitting a notification to the originator mobile device that the selected first portion of plurality of identifying information links of the interactive profile has been transmitted to the recipient mobile device using the host server; and storing identification of the recipient mobile device and the time of transmission of the selected first portion of plurality of identifying information links of the interactive profile to the recipient mobile device in the central database for access by the originator mobile device.

2. The method of claim 1, further comprising the steps of:
receiving a request from the recipient mobile device to share the selected first portion of plurality of identifying information links of the interactive profile with a second recipient mobile device;
generating and transmitting the request from the recipient mobile device to share the selected first portion of plurality of identifying information links of the interactive profile with the second recipient mobile device to the originator mobile device;
selecting a second portion of the plurality of identifying information links of the interactive profile from the selected first portion of plurality of identifying information links to share with the second recipient mobile device on the originator mobile device;
generating and transmitting a second sharing link for the second portion of the plurality of identifying information links of the interactive profile to the originator mobile device that initiates a request on the originator mobile device to access the second sharing link and accept transmission of the second portion of the plurality of identifying information links of the interactive profile to the second recipient mobile device;
receiving an acceptance from the originator mobile device to transmit the second portion of the plurality of identifying information links of the interactive profile to the second recipient mobile device;
generating and transmitting a third sharing link for the second portion of the plurality of identifying information links of the interactive profile to the second recipient mobile device that initiates a request on the second recipient mobile device to access the third sharing link and accept the second portion of the plurality of identifying information links of the interactive profile;
receiving an acceptance from the second recipient mobile device to receive the second portion of the plurality of identifying information links of the interactive profile;
transmitting the second portion of the plurality of identifying information links of the interactive profile to the second recipient mobile device using the host server;
transmitting a notification to the originator mobile device that the second portion of the plurality of identifying information links of the interactive profile has been transmitted to the second recipient mobile device using the host server; and
storing identification of the second recipient mobile device and the time of transmission of the second portion of the plurality of identifying information links of the interactive profile to the second recipient mobile device in the central database for access by the originator mobile device.

3. The method of claim 2, further comprising the steps of:
receiving a request from the second recipient mobile device to share the selected second portion of plurality of identifying information links of the interactive profile with a third recipient mobile device;
generating and transmitting the request from the second recipient mobile device to share the selected second portion of plurality of identifying information links of the interactive profile with the third recipient mobile device to the originator mobile device;
selecting a third portion of the plurality of identifying information links of the interactive profile from the selected second portion of plurality of identifying information links to share with the third recipient mobile device on the originator mobile device;
generating and transmitting a fourth sharing link for the third portion of the plurality of identifying information links of the interactive profile to the originator mobile device that initiates a request on the originator mobile device to access the fourth sharing link and accept transmission of the third portion of the plurality of identifying information links of the interactive profile to the third recipient mobile device;
receiving an acceptance from the originator mobile device to transmit the third portion of the plurality of identifying information links of the interactive profile to the third recipient mobile device;
generating and transmitting a fifth sharing link for the third portion of the plurality of identifying information links of the interactive profile to the third recipient mobile device that initiates a request on the third recipient mobile device to access the fifth sharing link and accept the third portion of the plurality of identifying information links of the interactive profile;
receiving an acceptance from the third recipient mobile device to receive the third portion of the plurality of identifying information links of the interactive profile;
transmitting the third portion of the plurality of identifying information links of the interactive profile to the third recipient mobile device using the host server;
transmitting a notification to the originator mobile device that the third portion of the plurality of identifying information links of the interactive profile has been transmitted to the third recipient mobile device using the host server; and
storing identification of the third recipient mobile device and the time of transmission of the third portion of the plurality of identifying information links of the interactive profile to the third recipient mobile device in the central database for access by the originator mobile device.

4. The method of claim 1, further comprising the steps of:
receiving a request from an N recipient mobile device to share the selected N portion of plurality of identifying information links of the interactive profile with a N+1 recipient mobile device;
generating and transmitting the request from the N recipient mobile device to share the selected N portion of plurality of identifying information links of the interactive profile with the N+1 recipient mobile device to the originator mobile device;
selecting an N+1 portion of the plurality of identifying information links of the interactive profile from the selected N portion of plurality of identifying information links to share with the N+1 recipient mobile device on the originator mobile device;
generating and transmitting an N sharing link for the N+1 portion of the plurality of identifying information links of the interactive profile to the originator mobile device that initiates a request on the originator mobile device to access the N sharing link and accept transmission of the N+1 portion of the plurality of identifying information links of the interactive profile to the N+1 recipient mobile device;
receiving an acceptance from the originator mobile device to transmit the N+1 portion of the plurality of identifying information links of the interactive profile to the N+1 recipient mobile device;

generating and transmitting an N+1 sharing link for the N+1 portion of the plurality of identifying information links of the interactive profile to the N+1 recipient mobile device that initiates a request on the N+1 recipient mobile device to access the third sharing link and accept the N+1 portion of the plurality of identifying information links of the interactive profile;

receiving an acceptance from the N+1 recipient mobile device to receive the N+1 portion of the plurality of identifying information links of the interactive profile;

transmitting the N+1 portion of the plurality of identifying information links of the interactive profile to the N+1 recipient mobile device using the host server;

transmitting a notification to the originator mobile device that the N+1 portion of the plurality of identifying information links of the interactive profile has been transmitted to the N+1 recipient mobile device using the host server; and storing identification of the N+1 recipient mobile device and the time of transmission of the N+1 portion of the plurality of identifying information links of the interactive profile to the N+1 recipient mobile device in the central database for access by the originator mobile device.

5. The method of claim 1, wherein rejection of the request from the recipient mobile device to accept the first portion of the plurality of identifying information links of interactive profile is transmitted to the originator mobile device, and the time of rejection is stored in the central database for access by the originator mobile device.

6. The method of claim 2, wherein rejection of the request to accept transmission of the second portion of the plurality of identifying information links of the interactive profile to the second recipient mobile device from the originator mobile device is stored in the central database for access by the originator mobile device.

7. The method of claim 2, wherein the originator mobile device prevents sharing of the second portion of the plurality of identifying information links of the interactive profile from the second recipient mobile device to any other recipient mobile device.

8. The method of claim 2, wherein the originator mobile device allows free sharing of the second portion of the plurality of identifying information links of the interactive profile from the second recipient mobile device to any other recipient mobile device, wherein any sharing of the second portion of the plurality of identifying information links of the interactive profile from the second recipient mobile device stores identification of all recipient mobile devices and the times of transmission to the central database for access by the originator mobile device.

9. The method of claim 1, wherein any updates to the interactive profile are automatically updated to all recipient mobile devices in substantial real time from the central database.

10. The method of claim 1, wherein the the plurality of identifying information links of the interactive profile comprises at least one on-line link to a third-party URL designated by the originator for direct access through a mobile browser software.

11. The method of claim 1, wherein the plurality of identifying information links of the interactive profile comprises at least one link to a phone number designated by the originator for direct access through a mobile phone system.

12. The method of claim 1, wherein the plurality of identifying information links of the interactive profile comprises at least pre-recorded audio message from the originator for direct access through an audio playback.

13. A method of substantial real time exchange of interactive profile information between an originator mobile device and N recipient mobile devices, comprising the steps of:

providing an interactive profile comprising a plurality of identifying information links on a host server comprising executable software, a data storage device, and at least one central database;

providing network access to the interactive profile on the originator mobile device;

selecting an N portion of the plurality of identifying information links of the interactive profile to share with N recipient mobile devices on the originator mobile device;

receiving a request from the originator mobile device to share the selected N portion of plurality of identifying information links of the interactive profile with the N recipient mobile devices;

generating and transmitting an N sharing link for the selected N portion of plurality of identifying information links of the interactive profile to the N recipient mobile devices that initiates a request on the N recipient mobile devices to access the N sharing link and accept the selected N portion of plurality of identifying information links of the interactive profile;

receiving an acceptance from the N recipient mobile devices to receive the selected N portion of plurality of identifying information links of the interactive profile;

transmitting the selected N portion of plurality of identifying information links of the interactive profile to the N recipient mobile devices using the host server;

transmitting a notification to the originator mobile device that the selected N portion of plurality of identifying information links of the interactive profile has been transmitted to the N recipient mobile devices using the host server;

storing identification of the N recipient mobile devices and the times of transmission of the selected N portion of plurality of identifying information links of the interactive profile to the N recipient mobile devices in the central database for access by the originator mobile device;

receiving a request on the host server from an N recipient mobile device to share the selected N portion of plurality of identifying information links of the interactive profile with a N+1 recipient mobile devices;

generating and transmitting the request from the N recipient mobile device to share the selected N portion of plurality of identifying information links of the interactive profile with the N+1 recipient mobile devices to the originator mobile device;

selecting an N+1 portion of the plurality of identifying information links of the interactive profile from the selected N portion of plurality of identifying information links to share with the N+1 recipient mobile devices on the originator mobile device;

generating and transmitting an N+1 sharing link for the N+1 portion of the plurality of identifying information links of the interactive profile to the originator mobile device that initiates a request on the originator mobile device to access the N+1 sharing link and accept transmission of the N+1 portion of the plurality of identifying information links of the interactive profile to the N+1 recipient mobile devices;

receiving an acceptance from the originator mobile device to transmit the N+1 portion of the plurality of identifying information links of the interactive profile to the N+1 recipient mobile devices;

generating and transmitting an N+2 sharing link for the N+1 portion of the plurality of identifying information links of the interactive profile to the N+1 recipient mobile devices that initiates a request on the N+1 recipient mobile devices to access the N+2 sharing link and accept the N+1 portion of the plurality of identifying information links of the interactive profile;

receiving an acceptance from the N+1 recipient mobile devices to receive the N+1 portion of the plurality of identifying information links of the interactive profile;

transmitting the N+1 portion of the plurality of identifying information links of the interactive profile to the N+1 recipient mobile devices using the host server;

transmitting a notification to the originator mobile device that the N+1 portion of the plurality of identifying information links of the interactive profile has been transmitted to the N+1 recipient mobile devices using the host server; and storing identification of the N+1 recipient mobile devices and the times of transmission of the N+1 portion of the plurality of identifying information links of the interactive profile to the N+1 recipient mobile devices in the central database for access by the originator mobile device.

14. The method of claim 13, wherein any updates to the interactive profile are automatically updated to all N and N+1 recipient mobile devices in substantial real time from the central database.

15. The method of claim 13, wherein the plurality of identifying information links of the interactive profile comprises at least one on-line link to a third-party URL designated by the originator for direct access through a mobile browser software.

16. The method of claim 13, wherein the plurality of identifying information links of the interactive profile comprises at least one link to a phone number designated by the originator for direct access through a mobile phone system.

17. The method of claim 13, wherein the plurality of identifying information links of the interactive profile comprises at least pre-recorded audio message from the originator for direct access through an audio playback software.

18. A method of substantial real time exchange of interactive profile information between an originator mobile device and N recipient mobile devices, comprising the steps of:

providing an interactive profile comprising a plurality of identifying information links on a host server comprising executable software, a data storage device, and at least one central database;

providing network access to the interactive profile on the originator mobile device;

selecting an N portion of the plurality of identifying information links of the interactive profile to share with N recipient mobile devices on the originator mobile device;

receiving a request from the originator mobile device to share the selected N portion of plurality of identifying information links of the interactive profile with the N recipient mobile devices;

generating and transmitting an N sharing link for the selected N portion of plurality of identifying information links of the interactive profile to the N recipient mobile devices that initiates a request on the N recipient mobile devices to access the N sharing link and accept the selected N portion of plurality of identifying information links of the interactive profile;

receiving an acceptance from the N recipient mobile devices to receive the selected N portion of plurality of identifying information links of the interactive profile;

transmitting the selected N portion of plurality of identifying information links of the interactive profile to the N recipient mobile devices using the host server;

transmitting a notification to the originator mobile device that the the selected N portion of plurality of identifying information links of interactive profile has been transmitted to the N recipient mobile devices using the host server;

storing identification of the N recipient mobile devices and the times of transmission of the selected N portion of plurality of identifying information links of the interactive profile to the N recipient mobile devices in the central database for access by the originator mobile device;

receiving a request on the host server from an N recipient mobile device to share the selected N portion of plurality of identifying information links of the interactive profile with a N+1 recipient mobile devices;

generating and transmitting the request from the N recipient mobile device to share the selected N portion of plurality of identifying information links of the interactive profile with the N+1 recipient mobile devices to the originator mobile device;

selecting an N+1 portion of the plurality of identifying information links of the interactive profile from the selected N portion of plurality of identifying information links to share with the N+1 recipient mobile devices on the originator mobile device;

generating and transmitting an N+1 sharing link for the N+1 portion of the plurality of identifying information links of the interactive profile to the N+1 recipient mobile devices that initiates a request on the N+1 recipient mobile devices to access the N+1 sharing link and accept the N+1 portion of the plurality of identifying information links of the interactive profile;

receiving an acceptance from the N+1 recipient mobile devices to receive the N+1 portion of the plurality of identifying information links of the interactive profile;

transmitting the N+1 portion of the plurality of identifying information links of the interactive profile to the N+1 recipient mobile devices using the host server;

transmitting a notification to the originator mobile device that the N+1 portion of the plurality of identifying information links of the interactive profile has been transmitted to the N+1 recipient mobile devices using the host server; and storing identification of the N+1 recipient mobile devices and the times of transmission of the N+1 portion of the plurality of identifying information links of the interactive profile to the N+1 recipient mobile devices in the central database for access by the originator mobile device.

19. The method of claim 18, wherein any updates to the interactive profile are automatically updated to all N and N+1 recipient mobile devices in substantial real time from the central database.

* * * * *